US 8,007,374 B2

(12) United States Patent
Bartsch et al.

(10) Patent No.: US 8,007,374 B2
(45) Date of Patent: Aug. 30, 2011

(54) MULTI-LAYER CORE GOLF BALL HAVING THERMOSET RUBBER COVER

(75) Inventors: Eric D. Bartsch, Lakeville, MA (US); Michael J. Sullivan, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 24 days.

(21) Appl. No.: 12/361,558

(22) Filed: Jan. 29, 2009

(65) Prior Publication Data

US 2009/0137341 A1    May 28, 2009

Related U.S. Application Data

(60) Division of application No. 11/561,923, filed on Nov. 21, 2006, which is a continuation-in-part of application No. 10/845,937, filed on May 14, 2004, now Pat. No. 7,138,460, and a continuation-in-part of application No. 11/109,341, filed on Apr. 19, 2005, now abandoned, and a continuation-in-part of application No. 10/773,906, filed on Feb. 6, 2004, now Pat. No. 7,255,656, and a continuation-in-part of application No. 10/755,638, filed on Jan. 12, 2004, now Pat. No. 7,357,733.

(51) Int. Cl.
A63B 37/06 (2006.01)
A63B 37/12 (2006.01)

(52) U.S. Cl. .................. 473/364; 473/376; 473/377

(58) Field of Classification Search ............ 473/351–377
See application file for complete search history.

(56) References Cited

U.S. PATENT DOCUMENTS

| | | | |
|---|---|---|---|
| 4,337,946 A * | 7/1982 | Saito et al. ................... | 473/356 |
| 4,625,964 A * | 12/1986 | Yamada ........................ | 473/373 |
| 4,650,193 A | 3/1987 | Molitor et al. | |
| 4,715,607 A | 12/1987 | Llort et al. | |
| 4,792,141 A | 12/1988 | Llort | |
| 4,863,167 A * | 9/1989 | Matsuki et al. ............... | 473/373 |
| 4,931,376 A | 6/1990 | Ikematsu et al. | |
| 4,974,852 A | 12/1990 | Hiraoka et al. | |
| 5,002,281 A * | 3/1991 | Nakahara et al. ............. | 473/373 |
| 5,008,137 A | 4/1991 | Nugent et al. | |
| 5,028,674 A | 7/1991 | Hatch et al. | |
| 5,048,838 A * | 9/1991 | Chikaraishi et al. .......... | 473/374 |
| 5,072,944 A * | 12/1991 | Nakahara et al. ............. | 473/373 |
| 5,252,652 A | 10/1993 | Egashira et al. | |
| 5,273,286 A | 12/1993 | Sun | |
| 5,306,760 A | 4/1994 | Sullivan | |
| 5,314,187 A | 5/1994 | Proudfit | |
| 5,334,673 A | 8/1994 | Wu | |
| 5,439,227 A * | 8/1995 | Egashira et al. ............... | 473/373 |
| 5,556,098 A * | 9/1996 | Higuchi et al. ............... | 473/373 |
| 5,585,440 A | 12/1996 | Yamada et al. | |
| 5,688,191 A | 11/1997 | Cavallaro et al. | |
| 5,692,974 A | 12/1997 | Wu et al. | |
| 5,695,413 A * | 12/1997 | Yamagishi et al. ........... | 473/374 |
| 5,697,856 A | 12/1997 | Moriyama et al. | |
| 5,725,442 A * | 3/1998 | Higuchi et al. ............... | 473/376 |
| 5,731,371 A | 3/1998 | Nesbitt et al. | |
| 5,733,205 A * | 3/1998 | Higuchi et al. ............... | 473/376 |
| 5,733,206 A | 3/1998 | Nesbitt et al. | |
| 5,743,816 A | 4/1998 | Ohsumi et al. | |
| 5,772,531 A | 6/1998 | Ohsumi et al. | |
| 5,776,012 A * | 7/1998 | Moriyama et al. ............ | 473/372 |
| 5,783,293 A | 7/1998 | Lammi | |
| 5,803,831 A | 9/1998 | Sullivan et al. | |
| 5,810,678 A | 9/1998 | Cavallaro et al. | |
| 5,816,937 A | 10/1998 | Shimosaka et al. | |
| 5,816,944 A | 10/1998 | Asakura et al. | |
| 5,830,086 A * | 11/1998 | Hayashi et al. ............... | 473/376 |
| 5,885,172 A | 3/1999 | Hebert et al. | |
| 5,902,855 A | 5/1999 | Sullivan | |
| 5,919,100 A | 7/1999 | Boehm et al. | |
| 5,929,171 A * | 7/1999 | Sano et al. .................... | 525/261 |
| 5,935,022 A * | 8/1999 | Sugimoto et al. ............. | 473/373 |
| 5,947,842 A | 9/1999 | Cavallaro et al. | |
| 5,952,415 A | 9/1999 | Hwang | |
| 5,965,669 A | 10/1999 | Cavallaro et al. | |
| 5,976,443 A | 11/1999 | Nesbitt et al. | |
| 5,998,506 A | 12/1999 | Nesbitt | |
| 6,018,003 A | 1/2000 | Sullivan et al. | |
| 6,056,842 A | 5/2000 | Dalton et al. | |
| 6,068,561 A | 5/2000 | Renard et al. | |
| 6,083,119 A | 7/2000 | Sullivan et al. | |
| 6,099,416 A | 8/2000 | Sullivan et al. | |
| 6,113,831 A | 9/2000 | Nesbitt et al. | |
| 6,117,025 A | 9/2000 | Sullivan | |
| 6,120,390 A * | 9/2000 | Dalton ......................... | 473/351 |
| 6,132,324 A | 10/2000 | Hebert et al. | |
| 6,139,447 A | 10/2000 | Ohama | |
| 6,152,834 A | 11/2000 | Sullivan | |
| 6,162,135 A * | 12/2000 | Bulpett et al. ................ | 473/373 |
| 6,180,040 B1 | 1/2001 | Ladd et al. | |
| 6,184,301 B1 | 2/2001 | Shindo et al. | |
| 6,210,293 B1 | 4/2001 | Sullivan | |
| 6,232,389 B1 * | 5/2001 | Feeney et al. ................. | 524/450 |
| 6,241,626 B1 | 6/2001 | Sullivan et al. | |
| 6,244,977 B1 | 6/2001 | Sullivan et al. | |
| 6,248,029 B1 * | 6/2001 | Maruko ........................ | 473/374 |

(Continued)

FOREIGN PATENT DOCUMENTS

| | | | |
|---|---|---|---|
| EP | 524841 A2 * | 1/1993 | |
| JP | 2001187171 | 7/2001 | |
| JP | 2003190329 A * | 7/2003 | |
| WO | WO 00/23519 | 4/2000 | |
| WO | WO 01/29129 | 4/2001 | |

*Primary Examiner* — Alvin Hunter

(74) *Attorney, Agent, or Firm* — Margaret C. Barker

(57) ABSTRACT

An all rubber golf ball with one or more thermosetting rubber core layers and one or more thermosetting rubber cover layer. At least one of the ball's layers has moisture vapor barrier property, and in one aspect the moisture vapor barrier layer is an intermediate layer. In one embodiment, the thermosetting rubber layers follow a cis- or a trans-polybutadiene gradient from the center of the ball to its cover.

3 Claims, No Drawings

U.S. PATENT DOCUMENTS

| | | |
|---|---|---|
| 6,284,840 B1 | 9/2001 | Rajagopalan et al. |
| 6,287,217 B1 | 9/2001 | Sullivan et al. |
| 6,291,592 B1 | 9/2001 | Bulpett et al. |
| 6,299,550 B1 | 10/2001 | Molitor et al. |
| 6,303,704 B1 | 10/2001 | Nesbitt |
| 6,309,314 B1 | 10/2001 | Sullivan et al. |
| 6,315,680 B1 | 11/2001 | Dalton et al. |
| 6,339,119 B1 | 1/2002 | Ladd et al. |
| 6,355,715 B1 | 3/2002 | Ladd et al. |
| 6,432,342 B1 | 8/2002 | Nesbitt et al. |
| 6,465,578 B1 | 10/2002 | Bissonnette et al. |
| 6,468,168 B1 | 10/2002 | Nesbitt et al. |
| 6,475,417 B2 | 11/2002 | Nesbitt et al. |
| 6,489,401 B2 | 12/2002 | Endo |
| 6,525,141 B2 | 2/2003 | Kataoka |
| 6,566,483 B2 | 5/2003 | Cho et al. |
| 6,620,061 B1 | 9/2003 | Ichikawa et al. |
| 6,632,147 B2 | 10/2003 | Cavallaro et al. |
| 6,635,716 B2 | 10/2003 | Voorheis et al. |
| 6,652,943 B2 | 11/2003 | Tukachinsky et al. |
| 6,653,382 B1 | 11/2003 | Statz et al. |
| 6,695,716 B2 | 2/2004 | Higuchi et al. |
| 6,780,126 B2 | 8/2004 | Ladd et al. |
| 6,878,777 B2 | 4/2005 | Iwami |
| 6,881,794 B2 | 4/2005 | Voorheis et al. |
| 6,916,254 B2 | 7/2005 | Ladd et al. |
| 6,953,820 B2 | 10/2005 | Statz et al. |
| 7,004,854 B2 | 2/2006 | Hogge et al. |
| 7,090,798 B2 | 8/2006 | Hebert et al. |
| 7,138,460 B2 * | 11/2006 | Sullivan et al. ............... 525/261 |
| 7,192,688 B2 | 3/2007 | Klang et al. |
| 2001/0009310 A1 | 7/2001 | Hebert et al. |
| 2002/0019268 A1 | 2/2002 | Tsunoda et al. |
| 2002/0052253 A1 | 5/2002 | Fushihara et al. |
| 2003/0050373 A1 | 3/2003 | Chen |
| 2003/0114565 A1 | 6/2003 | Chen et al. |
| 2003/0207998 A1 | 11/2003 | Voorheis et al. |
| 2005/0187347 A1 | 8/2005 | Sullivan et al. |

* cited by examiner

MULTI-LAYER CORE GOLF BALL HAVING THERMOSET RUBBER COVER

CROSS REFERENCE TO RELATED APPLICATIONS

This application is a divisional of U.S. patent application Ser. No. 11/561,923, filed Nov. 21, 2006, which is a continuation-in-part of U.S. patent application Ser. No. 10/845,937, filed May 14, 2004, now U.S. Pat. No. 7,138,460, and a continuation-in-part of U.S. patent application Ser. No. 11/109,341, filed on Apr. 19, 2005, now abandoned, and a continuation-in-part of U.S. patent application Ser. No. 10/773,906, filed on Feb. 6, 2004, now U.S. Pat. No. 7,255, 656, and also a continuation-in-part of U.S. patent application Ser. No. 10/755,638, filed on Jan. 12, 2004, now U.S. Pat. No. 7,357,733, each of which is incorporated herein by reference in its entirety.

FIELD OF THE INVENTION

The present invention relates to a novel structure for a golf ball, and more particularly to a substantially multi-layer all rubber golf ball with one or more thermosetting rubber core layers and a thermosetting rubber cover layer. The inventive ball has a moisture vapor barrier layer or moisture vapor barrier property.

BACKGROUND OF THE INVENTION

Conventional golf balls can be divided into several general classes: (a) solid golf balls having one or more layers, and (b) wound golf balls. Solid golf balls include one-piece balls, which are easy to construct and relatively inexpensive, but have poor play characteristics and are thus generally limited for use as range balls. Two-piece balls are constructed with a generally solid core and a cover, and are generally the most popular with recreational golfers because they are very durable and provide maximum distance. Balls having a two-piece construction are commonly formed of a polymeric core encased by a cover. Typically, the core is formed from polybutadiene that is chemically crosslinked with zinc diacrylate, other similar crosslinking agents and additives. These balls are generally easy to manufacture, but are regarded as having limited play characteristics. Solid golf balls also include multi-layer golf balls that are comprised of a solid core of one or more layers and/or a cover of one or more layers. These balls are regarded as having an extended range of play characteristics.

Wound golf balls are generally preferred by many players due to their high spin and soft "feel" characteristics. Wound golf balls typically include a solid, hollow, or fluid-filled center, surrounded by a tensioned elastomeric material and a cover. Wound balls generally are more difficult and expensive to manufacture than solid two-piece balls.

A variety of golf balls have been designed by manufacturers to provide a wide range of play characteristics, such as compression, velocity, "feel," and spin. These characteristics can be optimized for various playing abilities. Some of the most common components that manufacturers have addressed for optimizing and/or altering the play characteristics of golf balls are the polymer components present in modern golf ball construction, in particular, golf ball centers and/or cores.

In addition to changing center or core ingredients to affect golf ball performance characteristics, a number of patents have issued that are directed towards modifying covers used in forming golf balls. The most common polymers used by manufacturers in golf ball covers have been ionomers such as SURLYN®, commercially available from E.I. DuPont de Nemours and Co. of Wilmington, De. Manufacturers have also investigated the use of alternative polymers such as polyurethane. For example, U.S. Pat. No. 5,334,673 discloses the use of two categories of polyurethane available on the market, i.e. thermoset and thermoplastic polyurethanes, for forming golf ball covers and, in particular, thermoset polyurethane covered golf balls made from a composition of polyurethane prepolymer and a slow-reacting amine curing agent, and/or a difunctional glycol.

U.S. Pat. No. 5,314,187 discloses a golf ball with a core and a cover which is formed from two separate inner and outer layers. The inner layer is molded over the core and is formed from ionomer resin. The outer layer is molded over the inner layer and is formed from a blend of natural or synthetic balata and a crosslinkable elastomer such as polybutadiene. The elastomer is thermally crosslinked with a metallic salt of an unsaturated fatty acid, such as zinc diacrylate, and a crosslinking initiator such as organic peroxide.

U.S. Pat. No. 5,334,673 discloses a golf ball made from a composition of a polyurethane prepolymer and a slow-reacting polyamine curing agent and/or a difunctional glycol. Such a golf ball has improved resiliency and shear resistance over golf balls made from conventional polyurethane formulations.

U.S. Pat. No. 6,620,061 discloses a golf ball core and an enclosure of one or more layers enclosing the core, wherein at least one enclosure layer is formed of a rubber composition comprising a base rubber based on 1,4-polybutadiene having a cis-1,4-structure, an $\alpha,\beta$-unsaturated carboxylic acid, a metal oxide, and a polymerization initiator.

U.S. Patent App. Publication No. 2003/0158340 discloses a golf ball formed of a core and cover, which is formed mainly of diene rubber having a smaller trans structure content before the rubber is crosslinked than after the rubber is crosslinked.

A number of patents have also been issued that are directed to moisture vapor barrier layers. U.S. Pat. No. 5,820,488 discloses a barrier layer having a water vapor transmission rate lower than the cover, formed from polyvinylidene chloride, vermiculite, or a barrier-forming material disposed on the core through an in situ reaction. U.S. Pat. No. 5,875,891 discloses an impermeable packaging that limits moisture absorption by golf balls during storage. U.S. Pat. Nos. 5,885, 172 and 6,132,324 disclose thin, hard ionomer-based, inner covers that offer some resistance to water vapor penetration without affecting other ball properties. U.S. Pat. No. 6,232, 389 discloses a barrier layer for an air-filled or gas-filled game ball, formed from an aqueous solution of an elastomer, a dispersed exfoliated layered filler, and a surfactant. U.S. Pat. No. 6,398,668 discloses an oxygen barrier layer composed of ethylene vinyl alcohol copolymer. Parent U.S. Pat. No. 6,632, 147 discloses a moisture vapor barrier layer wherein the primary ingredient of the intermediate layer is made from a material including polybutadiene, natural rubber, butyl-based rubber, acrylics, trans-polyisoprene, neoprene, chlorinated polyethylene, balata, multi-layer thermoplastic films, blends of ionomers, polyvinyl alcohol copolymer and polyamides, and dispersions of acid salts of polyetheramines. U.S. Pat. No. 7,004,854 discloses a golf ball moisture vapor barrier layer comprising a thermoplastic or thermoset composition of microparticles dispersed in a binder.

However, there remains a need for a substantially all rubber golf ball with one or more thermosetting rubber core layers, a thermosetting rubber cover layer, wherein at least one of the layers has moisture vapor barrier properties.

SUMMARY OF THE INVENTION

This invention is directed to a golf ball comprising at least a core layer and a cover layer wherein said core layer and said cover layer each comprises a cross-linked thermoset rubber composition, wherein the primary rubber component of said core layer is different than the primary rubber component of said cover layer, and wherein at least one of the layers in the golf ball is a moisture vapor barrier layer that has a moisture vapor transmission rate of less than about 0.95 grams·mm/(m$^2$·day).

In another aspect of the invention, a golf ball comprises a core layer, a cover layer, and at least one intermediate layer disposed between the core and the cover, wherein said core layer, said cover layer, and said at least one intermediate layer each comprises a cross-linked thermoset rubber composition, wherein the primary rubber component comprises a polybutadiene, a crosslinking initiator, and optionally at least one other rubber component in an amount less than that of the primary rubber component. The relative cis-1,4-polybutadiene content of the core layer ($\delta_{cr}$), the intermediate layer ($\delta_{im}$), and the cover layer ($\delta_{cv}$) can be represented by the mathematical expression $\delta_{cr} \geq \delta_{im} \geq \delta_{cv}$. Alternatively, the relative trans-1,4-polybutadiene content of the cover layer ($\epsilon_{cv}$), the intermediate layer ($\epsilon_{im}$), and the core layer ($\epsilon_{cr}$) can be represented by the mathematical expression $\epsilon_{cv} \geq \epsilon_{im} \geq \epsilon_{cr}$.

DETAILED DESCRIPTION OF THE INVENTION

One embodiment of the present invention relates to multilayer golf balls having a core, and a cover wherein each layer comprises a thermoset polymer composition comprising at least one crosslinkable polymer and a crosslinking initiator. At least one of the thermoset cover layer or core layer contains additives that improve its water vapor barrier property. Alternatively, the ball has an intermediate layer, which is a moisture vapor layer, and which may also be a high specific gravity layer or low specific gravity layer.

Another embodiment of the present invention also relates to multilayer golf balls wherein the core is formed of a crosslinkable polymer that comprises a polybutadiene having at least about 90% of cis-1,4 structure; the cover is formed of a crosslinkable polymer that comprises a polybutadiene having at least about 50% of trans-1,4 structure, and more preferably at least about 70% of trans-1,4 structure; and the intermediate layer is formed of a crosslinkable polymer that comprises a polybutadiene having less than about 90% cis-1,4 structure and less than about 50% of trans-1,4-structure or, more preferably, less than about 70% of trans-1,4 structure. The intermediate layer is a moisture vapor layer, which may also be a high specific gravity layer or low specific gravity layer.

According to this invention, the polymeric composition of each layer generally comprises a thermoset polymer composition comprising at least one crosslinkable polymer. The crosslinkable polymer can be polyolefins, fluoropolymers, and mixtures thereof. Natural or synthetic base rubber can be used, which includes polydienes, polyethylenes (PE), ethylene-propylene copolymers (EP), ethylene-butylene copolymers, polyisoprenes, polybutadienes (PBR), polystyrenebutadienes, polyethylenebutadienes, styrene-propylene-diene rubbers, ethylene-propylene-diene terpolymers (EPDM), fluorinated polymers thereof (e.g., fluorinated EP and fluorinated EPDM), and blends of one or more thereof. The crosslinkable polymer can be solid at ambient temperature. PBR is a preferred crosslinkable polymer. Suitable PBR may have high 1,4-cis content (e.g., at least 60%, such as greater than about 80%, or at least about 90%, or at least about 95%), low 1,4-cis content (e.g., less than about 50%), high 1,4-trans content (e.g., at least about 40%, such as greater than about 70%, or about 75% or 80%, or greater than about 90%, or about 95%), low 1,4-trans content (e.g., less than about 40%), high 1,2-vinyl content (e.g., at least about 40%, such as about 50% or 60%, or greater than about 70%), or low 1,2-vinyl content (e.g., less than about 30%, such as about 5%, 10%, 12%, 15%, or 20%). PBR can have various combinations of cis-, trans-, and vinyl structures, such as having a trans-structure content greater than cis-structure content and/or 1,2-vinyl structure content, having a cis-structure content greater than trans-structure content and/or 1,2-vinyl structure content, or having a 1,2-vinyl structure content greater than cis-structure content or trans-structure content. The various polybutadienes may be utilized alone or in blends of two or more thereof to formulate different compositions in forming golf ball components (cores, covers, and portions or layers within or in between) of any desirable physical and chemical properties and performance characteristics.

Other parameters used in determining suitable base rubber materials include Mooney viscosity, solution viscosity, weight or number average molecular weights, and polydispersity, among others. The base rubber may comprise rubbers of high Mooney viscosity. The base rubber can have a Mooney viscosity greater than about 35, such as greater than about 50, or mid Mooney viscosity range of about 40 to about 60, or high Mooney viscosities of greater than about 65. The polybutadiene rubber can have a weight average molecular weight greater than about 400,000 and a polydispersity of no greater than about 2. A common indicator of the degree of molecular weight distribution of a polymer is its polydispersity, defined as the ratio of weight average molecular weight, $M_w$, to number average molecular weight, $M_n$. Polydispersity ("dispersity") also provides an indication of the extent to which the polymer chains share the same degree of polymerization. If the polydispersity is 1.0, then all polymer chains must have the same degree of polymerization. Since $M_w$ is always equal to or greater than $M_n$, polydispersity, by definition, is equal to or greater than 1.0

Examples of desirable polybutadiene rubbers include BUNA® CB22 and BUNA® CB23, commercially available from Bayer of Akron, Ohio; UBEPOL® 360L and UBEPOL® 150L, commercially available from UBE Industries of Tokyo, Japan; and CARIFLEX® BCP820 and CARIFLEX® BCP824, and BR1220, commercially available from Dow Chemicals of Midland, Mich.

The base rubber, e.g. PBR, may also be mixed with other elastomers, such as diene and saturated rubbers, known in the art, including natural rubbers, polyisoprene rubbers, styrene-butadiene rubbers, synthetic natural rubbers, diene rubbers, saturated rubbers, polyurethane rubbers, polyurea rubbers, metallocene-catalyzed polymers, plastomers, and multi-olefin polymers (homopolymers, copolymers, and terpolymers) in order to modify the properties of the core. With a major portion (such as greater than 50% by weight, or greater than about 80%) of the base rubber being a polybutadiene or a blend of two, three, four or more polybutadienes, these other miscible elastomers can be present in amounts of less than 50% by weight of the total base rubber, such as in minor quantities of less than about 30%, less than about 15%, or less than about 5%. In one example, the polymeric composition comprises less than about 20% balata, such as 18% or less, or 10% or less, and can be substantially free of balata (i.e., less than about 2%).

The diene rubber of the present invention is preferably cured with peroxide by blending a product of blending the diene rubber with an initiating agent, followed by curing in a mold for a set time at an elevated temperature and pressure. Suitable initiating agents include dicumyl peroxide; 2,5-dimethyl-2,5-di(t-butylperoxy) hexane; 2,5-dimethyl-2,5-di(t-butylperoxy)hexyne-3; 2,5-dimethyl-2,5-di(benzoylperoxy) hexane; 2,2'-bis(t-utylperoxy)-di-iso-propylbenzene; 1,1-bis(t-butylperoxy)-3,3,-5-trimethylcyclohexane; n-butyl 4,4-bis(t-butylperoxy)valerate; t-butyl perbenzoate; benzoyl peroxide; n-butyl 4,4'-bis(butylperoxy) valerate; di-t-butyl peroxide; or 2,5-di-(t-butylperoxy)-2,5 dimethyl hexane, lauryl peroxide, t-butyl hydroperoxide, a-a bis(t-butylperoxy) diisopropylbenzene, di(2-t-butylperoxyisopropyl)benzene peroxide, 3,3,5-trimethyl cyclohexane, di-t-amyl peroxide, di-t-butyl peroxide, t-butyl cumyl peroxide. Preferably, the polymer composition includes from about 0.01 to about 3.0 parts per hundred (phr) initiating agent to produce the peroxide-cured diene rubber of the present invention.

The polymeric composition of the present invention may also include a cis-to-trans catalyst. Preferably, the composition of the present invention contains from about 0.05 to about 3.0 phr cis-to-trans catalyst. Suitable cis-to-trans catalysts include an organosulfur or metal-containing organosulfur compound, a substituted or unsubstituted aromatic organic compound that does not contain sulfur or metal, an inorganic sulfide compound, an aromatic organometallic compound, or mixtures thereof. The cis-to-trans catalyst component may include one or more of the cis-to-trans catalysts described herein. For example, the cis-to-trans catalyst may be a blend of an organosulfur component and an inorganic sulfide component.

As used herein, "cis-to-trans catalyst" means any component or a combination thereof that will convert at least a portion of cis-isomer to trans-isomer at a given temperature. The cis-to-trans catalyst component may include one or more cis-to-trans catalysts described herein, but typically includes at least one organosulfur component, a Group VIA component, an inorganic sulfide, or a combination thereof. In one embodiment, the cis-to-trans catalyst is a blend of an organosulfur component and an inorganic sulfide component or a Group VIA component.

As used herein when referring to the invention, the term "organosulfur compound(s)" or "organosulfur component(s)," refers to any compound containing carbon, hydrogen, and sulfur. As used herein, the term "sulfur component" means a component that is elemental sulfur, polymeric sulfur, or a combination thereof. It should be further understood that "elemental sulfur" refers to the ring structure of $S_8$ and that "polymeric sulfur" is a structure including at least one additional sulfur relative to the elemental sulfur. The catalyst component may include one or more cis-to-trans catalysts described herein, but typically includes at least one organosulfur component, a Group VIA component, an inorganic sulfide, or a combination thereof. In one embodiment, the cis-to-trans catalyst is a blend of an organosulfur component and an inorganic sulfide component or a Group VIA component.

The preferred organosulfur components include 4,4'-diphenyl disulfide, 4,4'-ditolyl disulfide, or 2,2'-benzamido diphenyl disulfide, or a mixture thereof. Additional preferred organosulfur components include, but are not limited to, pentachlorothiophenol (PCTP), zinc pentachlorothiophenol (Zn-PCTP) or metal salts thereof, non-metal salts of PCTP, such as ammonium salt of pentachlorothiophenol magnesium pentachlorothiophenol, cobalt pentachlorothiophenol, pentafluorothiophenol, zinc pentafluorothiophenol, and blends thereof. Preferred candidates are pentachlorothiophenol (available from Strucktol Company of Stow, Ohio), zinc pentachlorothiophenol (available from eChinachem of San Francisco, Calif.), and blends thereof. Additional examples are described in commonly-owned co-pending U.S. Patent App. Publication No. 2004/0242802, which is incorporated by reference in its entirety.

The organosulfur cis-to-trans catalyst, when present, is preferably present in an amount sufficient to produce the reaction product so as to contain at least about 12 percent trans-polybutadiene isomer, but typically is greater than about 32 percent trans-polybutadiene isomer based on the total resilient polymer component. Alternatively, cis-to-trans catalyst is present in the polymeric composition by at least about 0.01 phr, preferably at least about 0.05 phr, more preferably at least about 0.1 phr, even more preferably greater than about 0.25 phr, optionally greater than about 2 phr, such as greater than about 2.2 phr, or even greater than about 2.5 phr, but no more than about 10 phr, preferably less than about 5 phr, more preferably less than about 2 phr, even more preferably less than about 1.1 phr, such as less than about 0.75 phr, or even less than about 0.6 phr.

Metal-containing organosulfur components may also be used according to the invention. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof. Additional suitable examples of cis-to-trans catalysts include those disclosed in U.S. Pat. Nos. 7,005,479; 6,525,141; 6,465,578; 6,184,301; 6,139,447; 5,697,856; 5,816,944; and 5,252,652, which are incorporated herein by reference in their entireties.

Suitable substituted or unsubstituted aromatic organic components that do not include sulfur or a metal include, but are not limited to, 4,4'-diphenyl acetylene, azobenzene, or a mixture thereof. The aromatic organic group preferably ranges in size from $C_6$ to $C_{20}$, and more preferably from $C_6$ to $C_{10}$. Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth.

The cis-to-trans catalyst can also include a Group VIA component. Elemental sulfur and polymeric sulfur are commercially available from, e.g., Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the trade name TELLOY®, and an exemplary selenium catalyst under the trade name VANDEX® are each commercially available from RT Vanderbilt. A further list of suitable organosulfur compounds, halogenated thiophenols, and disulfides are disclosed in U.S. Patent App. Publication No. 2004/0242802, which was previously incorporated by reference in its entirety.

The polymeric composition of the present invention may also include co-crosslinking agents. Suitable co-crosslinking agents all have di- or polyunsaturation and at least one readily extractable hydrogen in the a position to the unsaturated bonds. Useful co-crosslinking agents include, but are not limited to, mono- or polyfunctional unsaturated carboxylate metallic compounds, polyesters, polyamides, or esteramides of unsaturated carboxylic acids, bismaleimides, allyl esters of cyanurates, allyl esters of isocyanurates, allyl esters of aromatic acids, mono- and polyunsaturated polycarboxylic acids and anhydrides and esters thereof, liquid vinyl 1,2-polybutadiene homopolymers and copolymers, and mixtures thereof. Unsaturated carboxylate functional compounds are Type I co-crosslinking agents. They differ from all others, which are Type II co-crosslinking agent, in their effect on the curing characteristics of the system. Type I co-crosslinking agents generally form relatively more reactive free radicals which increase both cure rate and the state of cure of the system, and form ionic crosslinks primarily. Type II co-crosslinking agents form relatively less reactive and more stable free radicals and increase primarily the state of cure of the elastomer, and primarily form carbon-carbon crosslinks. The co-crosslinking agent is present in the amount from about 2 parts per one-hundred parts by weight of the base rubber (phr) to about 60 phr, such as about 5 phr, 10 phr, 15 phr, 20 phr, 25 phr, 30 phr, or 40 phr.

Unsaturated carboxylate functional compounds typically have one or more $\alpha,\beta$-ethylenically unsaturated carboxylate functionalities such as acrylates and methacrylates. Preferably, the compounds also have one or more metal ions associated with one or more of the unsaturated carboxylate functionalities, such as Zn, Ca, Co, Fe, Mg, Ti, Ni, Cu, etc. Alternatively, the unsaturated carboxylate functional compounds are condensation products of unsaturated carboxylic acids with polyamines (forming polyamides), polyols (forming polyesters), or aminoalcohols (forming esteramides), such as, without limitation, tripropylene glycol diacrylate, Bisphenol A diglycidylether diacrylate, 1,6-Hexanediol diacrylate, 1,4-butanediol dimethacrylate, ethyleneglycol dimethacrylate, polyethylene glycol dimethacrylate, diethylene glycol dimethacrylate, urethane dimethacrylate, tetraethylene glycol dimethacrylate, triethylene glycol dimethacrylate, trimethylolpropane trimethacrylate, pentaerythritol triacrylate, and trimethylopropane triacrylate. Metallic compounds of difunctional unsaturated carboxylates include, without limitation, zinc diacrylate (ZDA), zinc dimethacrylate (ZDMA), calcium diacrylate, and a blend thereof. Metallic compounds of polyfunctional unsaturated carboxylates include reaction products of a) mono-basic unsaturated carboxylic acids such as acrylic acid and/or methacrylic acid, b) di-basic and/or polybasic carboxylic acids having mono- or polyunsaturation, and/or anhydrides thereof, such as those disclosed herein below, and c) divalent metal oxide. Examples of such metallic compounds and their synthesis are disclosed in U.S. Pat. No. 6,566,483, the entirety of which is incorporated herein by reference.

Additional materials may be incorporated into any one of the reactive compositions of the present disclosure, or any one or more of the reactive subcomponents thereof. As disclosed in U.S. Pat. No. 7,115,703, which is incorporated herein by reference in its entirety, these additives include, but are not limited to fillers, antioxidants, moisture scavengers, light stabilizers, photoinitiators, and silane crosslinkers.

As used herein, the term "filler" refers to any compound or composition or mixture thereof that can be used to vary certain properties of selected portions of the golf ball, including density or specific gravity, flexural modulus, tensile modulus, tear strength, moment of inertia, hardness, abrasion resistance, weatherability, volume, weight, etc. The fillers can be in the forms of nano-scale or micro-scale powders, fibers, filaments, flakes, platelets, whiskers, wires, tubes, or particulates for homogenous dispersion. Suitable fillers for golf balls may be solid or hollow, and include, for example, metal (or metal alloy) powder, metal oxide and salts, ceramics, particulates, carbonaceous materials, polymeric materials, glass microspheres, and the like or blends thereof. Non-limiting examples of metal (or metal alloy) powders include bismuth, brass, bronze, cobalt, copper, inconel, iron, molybdenum, nickel, stainless steel, titanium, aluminum, tungsten, beryllium, zinc, magnesium, manganese, and tin. Non-limiting examples of metal oxides and salts include zinc oxide, iron oxide, aluminum oxide, titanium dioxide, magnesium oxide, zirconium oxide, tungsten trioxide, zirconium oxide, tungsten carbide, tungsten oxide, tin oxide, zinc sulfide, zinc sulfate, zinc carbonate, barium sulfate, barium carbonate, calcium carbonate, calcium metasilicate, magnesium carbonate, and silicates. Non-limiting examples of carbonaceous materials include graphite and carbon black. Examples of other useful fillers include precipitated hydrated silica, boron, clay, talc, glass fibers, aramid fibers, mica, diatomaceous earth, regrind (typically recycled core material mixed and ground to 30 mesh particle size), high Mooney viscosity rubber regrind, and mixtures thereof. Examples of polymeric materials include, but are not limited to, hollow spheres or microspheres of chemically or physically foamed thermoplastic or thermosetting polymers, such as epoxies, urethanes, polyesters, nucleated reaction injection molded polyurethanes or polyureas.

Suitable antioxidants include di(t-butyl)hydroquinone and others as disclosed in U.S. Pat. No. 4,974,852, which is incorporated herein by reference entirely. As disclosed in U.S. Pat. No. 6,998,445, which is incorporated herein by reference in its entirety, antioxidants are typically included in conventional golf ball core compositions because antioxidants are included in the materials supplied by manufacturers of compounds used in golf ball cores. Without being bound to any particular theory, higher amounts of antioxidant in the reaction product may result in less trans-isomer content because the antioxidants consume at least a portion of the free radical source. Thus, even with high amounts of the free radical source in the reaction product, such as for example about 3 phr, an amount of antioxidant greater than about 0.3 phr may significantly reduce the effective amount of free radicals that are actually available to assist in a cis-to-trans conversion.

Moisture scavengers can be low-viscosity, reactive, non-reactive, include isocyanate-containing compounds such as monomeric compounds like p-tolune sulfonyl isocyanate (PTSI from VanDeMark Inc. of Lockport, N.Y.) and polymeric compounds like polymeric methylene diphenyl diisocyanate (PAPI® MDI from Dow Chemical), oxazolidines, oxazolanes, orthoformates such as trimethyl- and triethyl orthoformates, orthoacetates such as trimethyl- and triethyl orthoacetates, alkyl (linear or branched $C_1$ to $C_{12}$ alkyls) esters of toluene sulfonic acid such as methyl p-toluene sulfonate (MTS), and vinyl silanes. These moisture scavengers can be used alone or in combination thereof, or in combinations with other moisture scavengers such as calcium oxide and molecular sieves. The amount of the moisture scavengers can be about 10 phr or less, such as about 5 phr or less, and can be about 0.01 phr or greater, such as about 0.05 phr or greater, or about 0.1 phr or greater.

The compositions may also comprise one or more light stabilizers to prevent significant yellowing from any unsaturated components contained therein, and to prevent cover surface fractures due to photo-degradation. As used herein, "light stabilizer" may be understood to include hindered amine light stabilizers, ultraviolet (UV) absorbers, and antioxidants. The light stabilizing component can be used in compositions having a difference in yellowness of about 12 or greater following one-hour exposure to QUV test per ASTM G 154-00a at an irradiance power of 1.00 W/m$^2$/nm, such as about 15 or greater. Light stabilizers can be used in visible layers, such as the outer cover layer, or any internal layer when the outer layer(s) are translucent or transparent. Suitable light stabilizers are disclosed in U.S. Pat. No. 7,115,703, which was previously incorporated herein reference in its entirety.

Referring now more specifically to the golf ball cores of the present invention, an exemplary material for the core contains polybutadiene with a high 1,4-cis content, a crosslinking agent, a free radical source, zinc stearate, a metal oxide, and one or more fillers to achieve specific purposes and desired effects. An example of such polybutadiene-based material is as follows:

100 parts polybutadiene polymer with a high 1,4-cis content,
15-45 parts zinc diacrylate,
0.01-2.0 parts peroxide,
1-25 parts zinc stearate,
5-20 parts zinc oxide, and
X part(s) filler, where X depends on the specific purposes and desired effects and where X is a number, including integers and real numbers. The exemplary polybutadiene-based material optionally contains 0.05 to 5.0 parts of ZnPCTP.

Blends of two or more polybutadienes with a high 1,4-cis content (e.g., at least 60%, such as greater than about 80%, or at least about 90%, or at least about 95%) are desirable for the solid cores. Examples of desirable polybutadiene rubbers include BUNA® CB22 and BUNA® CB23, commercially available from Bayer of Akron, Ohio; UBEPOL® 360L and UBEPOL® 150L, commercially available from UBE Industries of Tokyo, Japan; and CARIFLEX® BCP820 and BCP824, commercially available from Dow Chemicals of Midland, Mich. The polybutadiene can also be mixed with other elastomers known in the art, such as natural rubber, polyisoprene rubber, styrene-butadiene rubber, synthetic natural rubber, and butyl-based rubber in order to modify the properties of the core.

Zinc diacrylate is preferred as a co-crosslinking agent because it provides golf balls with a high initial velocity, but the present invention is not limited thereto. Generally, suitable co-crosslinking agents for the polybutadiene-based solid cores include metal salts of unsaturated fatty acid having 3 to 8 carbon atoms, such as monoacrylate, diacrylate, monomethacrylate, and dimethacrylate. The metal can be magnesium, calcium, zinc, aluminum, sodium, lithium or nickel. Preferred crosslinking agents include zinc diacrylate, zinc dimethacrylate, and blends thereof. In the manufacturing process, it is beneficial to pre-blend some co-crosslinking agent(s) with the base rubber in a master batch prior to the addition of other components.

Peroxide is the preferred crosslinking initiator and is a free radical initiator, which promotes the crosslink reaction between the base rubber and the co-crosslinking agent, but the present invention is not limited thereto. Peroxide initiators are well known in the art and discussed above, and can be any known peroxides or blends thereof that decompose when heated during the cure cycle. Suitable peroxide initiators include organic peroxide compounds, such as dicumyl peroxide, di-t-butyl peroxide, 1,1-di(t-butylperoxy)-3,3,5-trimethylcyclohexane, α,α-bis(t-butylperoxy)-diisopropylbenzene, t-butyl perbenzoate, 2,5-dimethyl-2,5-di(t-butylperoxy)-hexane, and the like or blends thereof. Commercially available examples include, but are not limited to, Varox® 231XL and DCP-R from AtoFina, Perkadox® BC and 14 from Akzo Nobel, and Elastochem® DCP-70 from Rhein Chemie. It is understood to one skilled in the art to adjust the amount of the initiators according to their activity and concentration to affect the curing of the golf ball core.

The solid core may also include fillers to adjust hardness, strength, modulus, weight, density and/or specific gravity of the core. In one embodiment, the core is filled with a high density filler, such as metal or metal oxide filer to produce a low moment of inertia (MOI) golf ball. In another embodiment, the core is unfilled or has its density reduced by foaming or adding low density fillers, such as microballoons or microspheres, thereby producing a high MOI golf ball.

Suitable fillers include metal or alloy powders, metal oxides and salts, ceramics, particulate, carbonaceous materials, polymeric materials, glass microspheres, and the like or blends thereof. These fillers may be hollow, solid, filled, unfilled, surface treated, or non-surface treated. Specific fillers for the core include tungsten powder, tungsten carbide, zinc oxide, tin oxide, tungsten oxide, barium sulfate, zinc sulfate, barium carbonate, calcium carbonate, zinc carbonate, an array of silica and clay, regrind (recycled core material typically ground to about 30 mesh particle), and high Mooney viscosity rubber regrind.

Zinc oxide can be used as a dual functional filler in the present invention. One function of zinc oxide can be to vary density. A second function of zinc oxide can be participation as a co-agent in the crosslink reaction.

Other optional additives for the golf ball core are well known in the art, and may be blended into the core in amounts sufficient to achieve their specific purposes and desired effects. Such additives include antioxidants to prevent the breakdown of the base polymer, accelerators to speed up the polymerization reaction, processing aids or oils to affect Theological and mixing properties, activators such as zinc stearate, foaming agents, cis-to-trans agent such as ZnPCTP, adhesives, coupling agents, lubricants, stable free radicals, radical scavengers, scorch retarders, and blends thereof.

In a preferred form, the core has a diameter of at least 1.52 inches, more preferably at least 1.57 inches, and most preferably at least 1.58 inches. The core compression is maintained in the range of about 50 to 120 and preferably about 60 to 115. The core has a coefficient of restitution of at least about 0.800.

As used therein, the term "compression," also known as "ATTI compression," refers to points derived from a Compression Tester (ATTI Engineering Company, Union City, N.J.), a scale well known in the art for determining relative compression of a spherical object. Compression is a property of a material as measured on a golf ball construction such as a ball, a core, a core and one or more intermediate layers, etc., and not a property of a material per se.

As used herein, the term "coefficient of restitution" or "COR" for golf balls is defined as the ratio of a ball's rebound velocity to its initial incoming velocity when the ball is fired out of an air cannon into a rigid vertical plate. The faster a golf ball rebounds, the higher the COR it has, the more the total energy it retains when struck with a club, and the longer the ball flies. The initial velocity is about 50 ft/s to about 200 ft/s, and is usually understood to be 125 ft/s, unless otherwise specified. A golf ball may have different COR values at different initial velocities.

The golf ball cover of the present invention is preferably tough, cut-resistant, and selected from conventional materials used as golf ball covers based on the desired performance characteristics. An exemplary material for the cover contains a crosslinkable thermosetting polymer, a crosslinking agent, a free radical source, a metal oxide, titanium dioxide, and one or more fillers to achieve specific purposes and desired effects. An example of such material is as follows:

100 parts crosslinkable polymer,
0-25 parts zinc diacrylate,
0.01-1.50 parts peroxide,
1-10 parts zinc oxide,
0-30 parts titanium dioxide, and
X part(s) filler, where X depends on the specific purposes and desired effects and where X is a number, including integers and real numbers. The exemplary polybutadiene-based material optionally contains 0.05 to 5.0 parts of ZnPCTP.

The crosslinkable polymer is selected from ethylene propylene rubber, ethylene-propylene-diene terpolymer, styrene butadiene rubber, and polybutadiene having a high trans-1,4 structure. In a preferred form, the crosslinkable polymer is a polybutadine having a high 1,4-trans content (e.g., at least about 40%, such as greater than about 70%, or about 75% or 80%, or greater than about 90%, or about 95%).

Titanium oxide is a white pigment that is added to the cover layer as a colorant. Generally, pigments as well as dyes can be incorporated as colorants in the cover layer. Pigments may be fluorescent, autofluorescent, luminescent, or chemoluminescent, and include white pigments such as titanium oxide and zinc oxide.

A variety of other additives can optionally be incorporated into the cover layer compositions of the present invention in amounts sufficient to achieve their specific purposes and desired effects. For example, UV absorbers, light stabilizers (preferably hindered amine light stabilizers), and antioxidants are used to prevent cover yellowing and surface fractures due to photo-degradation. Other additives include, but are not limited to, accelerators, fillers, viscosity modifiers, release agents, plasticizers, compatibilizing agents, coupling agents, dispersing agents, optical brighteners, surfactants, lubricants, stabilizers, metals, processing aids or oils, blowing agents, freezing point depressants, and any other modifying agents known to one of ordinary skill in the art. Dispersing agents can be anionic, cationic, and nonionic, including materials otherwise known as leveling agents, emulsifiers, anti-foaming agents, wetting agents, surfactant, etc. Fillers are used to adjust properties such as density or specific gravity, flexural modulus, tensile modulus, strength, moment of inertia, hardness, abrasion resistance, weatherability, volume, weight, etc. The fillers are preferably in the forms of nano-scale or micro-scale powders, fibers, filaments, flakes, whiskers, wires, tubes, or particulates for homogenous dispersion.

In a preferred form, the cover has a thickness from about 0.015 to 0.080 inches. The cover has a Shore D hardness of from about 20 to 70,preferably 30 to 60.In another preferred form, the cover may be filled to a specific gravity of at least about 1.2,and preferably about 1.3.

The overall ball has a compression of 60 to 110.The overall ball has a coefficient of restitution of 0.750 to 0.850,preferably 0.790 to 0.830.

To prevent or minimize the penetration of moisture, typically water vapor, a moisture vapor barrier layer is disposed about or embedded in any portion of a golf ball where a reduction in the moisture vapor transmission rate (MVTR) is desirable. Such portions include, without limitation, the core, an intermediate layer between the core and the cover, and the cover. In a preferred form, the moisture vapor barrier layer is preferably disposed immediately around the core as an intermediate layer between the core and the cover. U.S. Pat. Nos. 6,632,147 and 7,004,854 disclose moisture vapor barrier layers, and are incorporated herein by reference in their entirety.

An exemplary material for the moisture vapor barrier layer contains polybutadiene, a crosslinking agent, a free radical source, a metal oxide, and one or more fillers to achieve specific purposes and desired effects. An example of such polybutadiene-based material is as follows:

100 parts polybutadiene polymer,
5-10 parts metal acrylate or methacrylate cross-linking agent,
5 parts zinc oxide
2 parts peroxide,
5-25 parts of aluminum flake, and
optional X part(s) of other filler(s), where X depends on the specific purposes and desired effects and where X is a number, including integers and real numbers. The exemplary polybutadiene-based material optionally contains 0.05 to 5.0 parts of ZnPCTP.

The filler comprises microparticles that are preferably hydrophobic and create a tortuous (random and non-linear) path across the barrier layer to reduce its MVTR. The microparticles for the present invention refer to particulates that are sized on the order of several hundred microns or less, and include nanoparticles that are sized from a few nanometers to less than about 1 micron. Suitable microparticles can be pigmented or non-pigmented, and include fibers, whiskers, and flaked metals (either leafing or non-leafing), such as aluminum flakes, iron oxide flakes, copper flakes, bronze flakes, and the like or combinations of two or more thereof. Leafing metal flakes are particularly suited for use in the present invention. Preferred metal flakes include aluminum flakes and, more specifically, aluminum oxide flakes. Microparticles sized preferably about 4 microns to about 335 microns, more preferably about 5 microns to about 50 microns, and most preferably about 8 microns to about 32 microns are used. The aspect ratio of the flakes is at least about 25,and up to about 30,000,preferably about 100 to about 50 to about 20,000,more preferably about 100 to about 10,000.The amount of the microparticles present in the barrier layer is at least about 10 parts by weight per 100 parts by weight of the rubber material ("phr"), preferably between about 50 phr and about 250 phr, more preferably between about 70 phr and about 125 phr. The barrier layer may have a single layer or a plurality of sub-layers.

As used herein, the term "aspect ratio" refers to the ratio of a platelet particle's lateral dimension to its thickness. The term "effective aspect ratio" refers to the aspect ratio of flake particles when dispersed in a binder such as a rubber or polymer matrix. Rather than being separated as singular flakes, the flakes may exist in many forms, such as a bundle of tens or hundreds of flakes known as agglomerates. The aspect ratio of the bundle or agglomerate (i.e., the effective aspect ratio), while usually being much lower than that of the single flake, is directly related to the barrier property of the flakes in the binder.

The barrier layer of the present invention is preferably disposed about or embedded in any portions of a golf ball where a reduction in MVTR is desirable. Such portions include, without limitation, the core, a center within the core, an outer core layer of the core, a wound layer, an intermediate layer between the core and the cover, and an inner cover layer of the cover. Two or more barrier layers of the same or different compositions may be used in a golf ball where two or more portions have moisture absorption problems. Advantageously, each barrier layer protects a pre-selected portion of the golf ball, such that if moisture vapor penetrates an outer barrier layer, the interior layers remain protected by the inner barrier layer(s). The barrier layer is placed adjacent to the golf ball portion, covering its entire outer surface or substantially encapsulating the portion. Optionally, an adhesive or a coupling agent is used to bond the barrier layer to the portion. Alternatively, an in situ reaction takes place to form direct chemical linkages between the barrier layer and the portion. The barrier layer is preferably adjoining, more preferably contiguous, to the underlying golf ball portion. Where a liquid core is used, the moisture vapor barrier layer may serve the added function of preventing moisture vapor from exiting the liquid core to the atmosphere.

In one preferred form, the moisture vapor barrier layer is also the cover layer. Alternatively, the core may also contain fillers that increase the moisture vapor barrier property of the core.

In another preferred form, the moisture vapor barrier layer is an intermediate layer made from cross-linkable polymers. In such a preferred form, the relative cis-1,4-polybutadiene content of the core layer ($\delta_{cr}$), the intermediate layer ($\delta_{im}$), and the cover layer ($\delta_{cv}$) is represented by the mathematical expression $\delta_{cr} \geq \delta_{im} \geq \delta_{cv}$. The value of $\delta_{cr}$ is preferably at least about 60% cis-1,4-polybutadiene, more preferably at least about 90% cis-1,4-polybutadiene, and most preferably at least about 95% cis-1,4-polybutadiene Alternatively, the relative trans-1,4-polybutadiene content of the cover layer ($\epsilon_{cv}$), the intermediate layer ($\epsilon_{im}$), and the core layer ($\epsilon_{cr}$) is represented by the mathematical expression $\epsilon_{cv} \geq \epsilon_{im} \geq \epsilon_{cr}$. The value of $\epsilon_{cv}$ is preferably at least about 40% trans-1,4-polybutadiene, more preferably at least about 70%, or about 75% or 80%, or about 90% trans-1,4-polybutadiene, and most preferably at least about 95% trans-1,4-polybutadiene.

Butyl-based or natural rubbers are also suitable primary ingredients, due to their low moisture vapor transmission rates. A preferred metal acrylate is zinc diacrylate. Other suitable primary ingredients include, but are not limited to, trans polyisoprene, neoprene, chlorinated polyethylene, balata, acrylics, etc.

The moisture barrier layer, whether the cover, intermediate layer, or core has a moisture vapor transmission rate less than that of the cover, preferably less than about 0.95 grams·mm/(m2·day). The moisture vapor transmission rate is defined as the mass of moisture vapor that diffuses into a material of a given thickness per unit area per unit time. The preferred standards of measuring the moisture vapor transmission rate include ASTM F1249-90 entitled "Standard Test Method for Water Vapor Transmission Rate Through Plastic Film and Sheeting Using a Modulated Infrared Sensor," and ASTM F372-99 entitled "Standard Test Method for Water Vapor Transmission Rate of Flexible Barrier Materials Using an Infrared Detection Technique," among others.

It is well known that the total weight of the ball has to conform to the weight limit set by the United States Golf Association ("USGA"). Redistributing the weight or mass of the ball either toward the center of the ball or toward the outer surface of the ball changes the dynamic characteristics of the ball at impact and in flight. Specifically, if the density is shifted or redistributed toward the center of the ball, the moment of inertia is reduced, and the initial spin rate of the ball as it leaves the golf club would increase due to lower resistance from the ball's moment of inertia. Conversely, if the density is shifted or redistributed toward or within the outer cover, the moment of inertia is increased, and the initial spin rate of the ball as it leaves the golf club would decrease due to the higher resistance from the ball's moment of inertia. The radial distance from the center of the ball or from the outer cover, where moment of inertia switches from being increased and to being decreased as a result of the redistribution of weight or mass density, is an important factor in golf ball design. U.S. Pat. No. 6,494,795, which is incorporated herein by reference in its entirety, discloses that the distribution of weight among the layers within a golf ball relative to a centroid radius modulates a golf ball's moment of inertia.

In one embodiment of the present invention, a golf ball can have a low spin rate and high moment of inertia as a result of microparticle fillers dispersed within the rubber material of any layer outside the core, e.g. the intermediate layer or the cover layer. With the presence of microparticles such as aluminum flakes, any layer outside the core can acquire a specific gravity that is higher than that of the core, resulting in a golf ball of high moment of inertia. A layer outside of the core can have a specific gravity of preferably about 1.2 g/cm$^3$ or higher, more preferably about 1.5 g/cm$^3$ or higher, and most preferably about 2.0 g/cm$^3$ or higher. Conversely, the core may be unfilled, foamed, filled with microballoons, hollow, or otherwise reduced in specific gravity to maximize the moment of inertia. The difference in specific gravity between a layer outside of the core and the core can be greater than about 0.1 g/cm$^3$. The core diameter is preferably greater than about 1.52 inches, more preferably about 1.57, and most preferably about 1.58.The thickness of the barrier layer can be less than about 0.2 inches, but is preferably less than about 0.02 inches, more preferably about 0.001 inches to about 0.01 inches, and most preferably about 0.002 inches to about 0.007 inches. Sward hardness of the barrier layer is preferably between about 5 and about 20. Pencil hardness of the barrier layer is preferably between about 5B and about F.

In a second embodiment of the present invention, a layer outside of the core, e.g. intermediate layer or cover layer, can acquire a specific gravity that is lower than that of the core, resulting in a golf ball of low moment of inertia and a high spin rate. A low specific gravity can be achieved by incorporating low density fillers or agents such as hollow fillers or microspheres in the polymeric matrix, where the cured composition has the preferred specific gravity. Suitable low density fillers or agents are disclosed in U.S. Pat. Nos. 6,494,795 and 6,692,380, each of which is incorporated herein by reference. A layer outside of the core can have a specific gravity of preferably about 1.0 g/cm$^3$ or lower, more preferably about 0.9 g/cm$^3$ or lower, and most preferably about 0.8 g/cm$^3$ or lower. Conversely, the core may be heavily filled with high density fillers such as those described in the preceding paragraph.

In a third embodiment of the present invention, a golf ball can have a large inner core or small inner core that is substantially free of fillers, which can adversely interfere with the inherent resiliency of the polymers used in golf balls and thereby the coefficient of restitution of the golf balls. Golf balls with a large inner core and a small inner core, substantially free of fillers, are respectively disclosed in U.S. Pat. Nos. 6,780,126 and 6,916,254,each of which is incorporated herein by reference in its entirety.

The '126 patent discloses an invention directed to golf balls having high resiliency, a low spin, and a high rotational momentum imparted by a large soft interior inner core and at least one weight shifted outer layer. Specifically, the invention encompasses golf balls having an inner core, an outer core, an inner cover, and an outer cover wherein the inner core is encased by an outer core wherein the inner core has a volume greater than the outer core, inner cover, or outer cover and the inner core is made of a material substantially free of fillers. The volume relationship of the inner core ($V_{icr}$), outer core ($V_{ocr}$), inner cover ($V_{icv}$), and outer cover ($V_{ocv}$) is represented by the mathematical relationship: $V_{icr} > 2.5(V_{ocr} + V_{icv} + V_{ocv})$, wherein $V_{ocr} \geq V_{ocv} \geq V_{icv}$. Also, the inner core has a specific gravity $\rho_{icr}$, the outer core has a specific gravity $\rho_{ocr}$, the inner cover has a specific gravity $\rho_{icv}$ and the outer cover has a specific gravity $\rho_{ocv}$, wherein the relationship between the specific gravities is expressed by the mathematical expression: $\rho_{icv} \geq \rho_{ocv} \geq \rho_{ocr} \geq \rho_{icr}$. Preferably, at least one core and one cover layer are made from cross-linkable polymer, and at least one of the layers has moisture vapor barrier property, as discussed above.

The '254 patent discloses an invention directed to golf balls having a low spin and a high rotational momentum imparted by a soft interior inner core and at least one weight shifted outer layer. Specifically, the invention encompasses golf balls having an inner core, an outer core, an inner cover, and an outer cover wherein the inner core is encased by an outer core wherein the outer core has a volume greater than the inner core, inner cover, or outer cover and the inner core is made of a material substantially free of fillers. The volume relationship of the inner core ($V_{icr}$), outer core ($V_{ocr}$), inner cover ($V_{icv}$) and outer cover ($V_{ocv}$) is represented by the mathematical relationship: $V_{ocr} > \frac{3}{5}(V_{icr} + V_{icv} + V_{ocv})$, wherein $V_{icr} \geq V_{ocv} \geq V_{icv}$. Also, the inner core has a specific gravity $\rho_{icr}$, the outer core has a specific gravity $\rho_{ocr}$, the inner cover has a specific gravity $\rho_{icv}$, and the outer cover has a specific gravity $\rho_{ocv}$, wherein the relationship between the specific gravities is expressed by the mathematical expression: $\rho_{icv} \geq \rho_{ocv} \geq \rho_{icr} > \rho_{ocr}$. Preferably, at least one core and one cover layer are made from cross-linkable polymer, and at least one of the layers has moisture vapor barrier property, as discussed above.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. A golf ball comprising a core layer, a cover layer, and at least one intermediate layer disposed between the core and the cover, wherein said core layer, said cover layer, and said at least one intermediate layer each comprises a cross-linked thermoset rubber composition having a primary rubber component of polybutadiene having a polydispersity of no greater than about 2 in an amount of greater than about 80% by weight and a crosslinking initiator, the core layer having a cis-1,4-polybutadiene content ($\delta_{cr}$), the at least one intermediate layer having a cis-1,4-polybutadiene content ($\delta_{im}$), and the cover layer having a cis-1,4-polybutadiene content ($\delta_{cv}$) such that $\delta_{cr} \geq \delta_{im} \delta_{cv}$, wherein the intermediate layer comprises a moisture vapor barrier layer and wherein the overall ball comprises a compression of 60 to 110 and a coefficient of restitution of from 0.750 to 0.850.

2. The golf ball of claim 1, wherein the thermoset rubber composition further comprises a cis-to-trans catalyst wherein the cis-to-trans catalyst comprises an organosulfur compound, metal-containing organosulfur compound, a substituted or unsubstituted aromatic organic compound that does not contain sulfur or metal, an inorganic sulfide compound, an aromatic organometallic compound, an element from Group VIA, or a combination thereof.

3. The golf ball of claim 2, wherein the organosulfur compound comprises pentachlorothiolphenol (PCTP) or a metal salt thereof.

* * * * *